United States Patent
Miyagi

[11] Patent Number: 5,867,481
[45] Date of Patent: Feb. 2, 1999

[54] NODE DEVICE AND ALARM NOTIFICATION CONTROL METHOD FOR ATM NETWORK

[75] Inventor: Morihito Miyagi, Kodaira, Japan

[73] Assignee: Hitachi, Ltd., Tokyo, Japan

[21] Appl. No.: 603,240

[22] Filed: Feb. 20, 1996

[30] Foreign Application Priority Data

Feb. 27, 1995 [JP] Japan .................................... 7-037947

[51] Int. Cl.$^6$ ...................................................... H04J 3/14
[52] U.S. Cl. ...................... 370/244; 370/392; 340/825.16
[58] Field of Search ........................ 340/825.16, 825.36, 340/825.06; 370/244, 218, 392

[56] References Cited

U.S. PATENT DOCUMENTS

| | | | |
|---|---|---|---|
| 5,274,641 | 12/1993 | Shobatake et al. ...................... | 370/392 |
| 5,343,462 | 8/1994 | Sekihata et al. .......................... | 370/244 |
| 5,398,236 | 3/1995 | Hemmady et al. ...................... | 370/218 |
| 5,636,206 | 6/1997 | Amemiya et al. ....................... | 370/244 |

OTHER PUBLICATIONS

B–ISDN Operation and Maintenance Principles and Functions, ITU–T I.610, International Telecommunication Union, 03–1993, pp. 12–13, 15–16.

*Primary Examiner*—Edwin C. Holloway III
*Attorney, Agent, or Firm*—Antonelli, Terry, Stout & Kraus, LLP

[57] ABSTRACT

In an asynchronous transfer mode (ATM) network, if an originating terminal notifies necessity or unnecessity of transmitting a fault notification signal through a call set-up message, the content of the notification is notified to respective node devices on a target virtual path (VP) in the procedures of transmission/reception of a call control message. Each of the node devices makes a virtual channel (VC) table of a line interface 100 corresponding to the VP store the information indicating necessity or unnecessity to transmit a fault notification signal. When a fault arises in the VP, one of the node devices on the downstream side detects the fault, its interface connected to the fault VP sees the VC table and determines the necessity or unnecessity of fault management operation and maintenance (OAM) cell support with respect to respective VCs multiplexed on the fault VP, so as to issue a fault management OAM cell with respect to only VCs regarded as necessary.

22 Claims, 6 Drawing Sheets

FIG. 2

200 VC TABLE

| VCI | VC | OAM |
|-----|----|----|
| 50 | 0 | 0 |
| 51 | 1 | 0 |
| 52 | 1 | 1 |
| 53 | 1 | 0 |
| 54 | 0 | 0 |
| 55 | 1 | 1 |
| 56 | 1 | 0 |

NODE DEVICE AND ALARM NOTIFICATION CONTROL METHOD FOR ATM NETWORK

BACKGROUND OF THE INVENTION

The present invention relates to an Asynchronous Transfer Mode (ATM) network, a node device such as an ATM exchange applied thereto, and an alarm notification control method. More particularly present invention relates to an ATM network, a node device and an alarm notification cell transfer control method having a control function to perform selective transmission and restriction of an alarm notification signal for every Virtual Connection (VC) multiplexed on a fault Virtual Path (VP).

In the recommendation I.610 "B-ISDN operation and maintenance principles and functions" of ITU-T (International Telecommunication Union Telecommunication Standardization Sector) approved in WTSC (World Telecommunication Standardization Conference) in March 1993, an alarm notification method for "Permanent Virtual Connection (PVC)" that is, processing method of an alarm notification OAM (Operation and Maintenance cell), is prescribed. In PVC, holding time of a connection set up from an operation system is relatively long (normally, at least several hours or more).

In the ITU-T I.610, however, there is no prescription about an alarm notification method for "Switched Virtual Connection (SVC)" in which holding time of a connection set up by a call control processor of an exchange every time a call is generated is relatively short.

According to the recommendations of ITU-T I.610, when a fault of a Virtual Path (VP) is detected during the period of connection set-up, the processing of fault detection notification will be performed upon PVCs formed on a fault VP (hereinafter VCs: describing the processing on Virtual Channels by way of example) in the following procedures.

FIG. 4 shows a portion of an ATM network where an originating VC user terminal 401 and a terminating VC user terminal 405 are connected with each other through an originating node 402, a transit node 403 and a terminating node 404. Then, assume that a fault arises at a place designated by the x-mark 421 on a Virtual Path (VP) having an upstream Virtual Channel (VC) 419 where a signal (ATM cell) is transferred from the originating VC user terminal 401 to the terminating VC user terminal 405.

The above VP fault (a fault of a lower layer than the VP, or a fault of the VP itself) is detected by the transit node 403 adjacent to the downstream side of the fault place. The transit node 403 transmits a VC-AIS (VC-Alarm Indication Signal) cell 422 for alarm notification toward the downstream of the VC 419 multiplexed on the fault VP. The VC-AIS cell 422 is terminated at the terminating VC user terminal (first device) which is to be an end point of the upstream VC 419.

Recognizing a fault on the VC through reception of the above VC-AIS cell, the first device transmits a VC-RDI (VC-Remote Defect Indication) cell 423 to a downstream VC 420 paired with the fault VC (upstream VC 419). Although the cell 423 is described as "VC-FERF: VC-Far End Receive Failure" in the above-mentioned ITU-T I.610, it has been agreed that the title "FERF" is altered to the title "RDI".

This VC-RDI cell 423 is terminated at the originating VC user terminal (second device) which is to be an end point of the downstream VC 420. The second device detects the VC-RDI cell 423 so as to recognize that there is a fault place on the way of the upstream VC 419 which is a transmission side to this device.

In the current circumstance in which there are no recommendations in ITU-T I.610, however, this fault detection notification method in the aforementioned PVC is applied as it is to SVC having shorter holding time of a connection. In this case, VC user terminals are compelled to have a function to deal with a fault management OAM cell (VC-AIS/RDI cell) even in SVC communication in which holding time of a connection is so short that the probability of a fault is small.

If VC user terminals performing communication by SVC are allowed to have no function for dealing with a fault management OAM cell in order to eliminate useless functions and simplify the structure of the terminals, VC user terminals having function for dealing with a fault management OAM cell and these VC user terminals having no function therefor are allowed to exist in the same network and, accordingly, each of the node devices constituting the ATM network is required to have the faculty to deal with both VCs having necessity to transfer VC-AIS/RDI cells and VCs having no necessity to transfer VC-AIS/RDI cells when a fault is detected. In such a situation, the following problems arise:

(1) how the necessity or unnecessity to transfer VC-AIS/RDI is notified from a VC user terminal to a node device;

(2) how the necessity or unnecessity to transfer VC-AIS/RDI in every VC is notified between node devices; and (3) how the necessity or unnecessity to transfer VC-AIS/RDI in every VC is judged in each of the node devices.

SUMMARY OF THE INVENTION

It is an object of the present invention to provide an ATM network and a node device in which in the case where a fault arises in a VP, transmission and restriction of an alarm notification signal can be performed selectively in accordance with the VC without compelling terminals performing SVC communication to have a function to deal with such an alarm notification signal.

It is another object of the present invention to provide an alarm notification control method in which useless alarm notification signals are restricted from being transmitting on a network, so that the communication resources can be used effectively.

It is a further object of the present invention to provide an alarm notification control method in which generation and transfer of a useless control cell can be restricted, effectively particularly in an ATM network where PVCs and SVCs coexist.

In order to attain the foregoing objects, according to an aspect of the present invention, means for storing control information indicating the necessity or unnecessity to transmit an alarm notification signal (OAM cell) in accordance with Virtual Connection (VC) is provided in each of node devices constituting an ATM network, so that when a fault is detected in any of Virtual Paths (VP), the necessity or unnecessity to transmit an alarm notification signal is determined upon each VC multiplexed on the fault VP on the basis of the control information, and an alarm notification signal is transferred selectively only upon VCs associated with user terminals having a function of processing an alarm notification signal.

More specifically, each of the node devices has means for controlling transmission of an alarm notification signal in a line interface portion provided for every input/output line, and the above-mentioned control information indicative of the necessity or unnecessity to transmit an alarm notification signal is stored in the form of a table in accordance with respective VC on a memory to which the transmission control means refers. Upon generation of an abnormality in any of input lines, the fault is detected by a line interface portion connected to this line, and the above-mentioned alarm notification signal transmission control means transmits an alarm notification signal to the downstream. Then, the necessity or unnecessity to transmit an alarm notification signal is determined through reference to the control information table with respect to each VC multiplexed on the fault line (VP), and the transmission of an alarm notification signal to the downstream is performed only upon VCs determined as necessary.

In another aspect of the present invention, each of user terminals notifies the above-mentioned necessity or unnecessity to transmit an alarm notification signal to the network at the time of set-up of a connection. Such notification is performed by the way that each of the user terminals sets predetermined control parameters in a call control message. A call control processor of any node device which has received the call control message notifies line interfaces in newly set-up connections of the above-mentioned control parameters together with connection set-up information, and the control information indicative of the necessity or unnecessity to transmit an alarm notification signal in accordance with each VC is stored in each of the interfaces.

According to the present invention, since the necessity or unnecessity to transmit an alarm notification signal in accordance with each VC is stored in each of the node devices, when a fault arises, useless control signals can be restricted from being issued upon VCs to which user terminals having no function of processing an alarm notification signal (OAM cell) is connected. In addition, because each of the user terminals notifies the necessity or unnecessity to transmit an alarm notification signal and this is transferred to each of nodes on a VP through call control parameters, notification between users and node devices and between node devices on the VP can be realized along a sequence defined by call control protocol.

BRIEF DESCRIPTION OF THE DRAWINGS

The foregoing and other objects, advantages, manner of operation and novel features of the present invention will be understood from the following detailed description when read in conjunction with the accompanying drawings in which:

FIG. 2 is a diagram illustrating a structure of a VC table provided in the ATM node;

DETAILED DESCRIPTION OF THE PREFERRED EMBODIMENT

Figure 1:
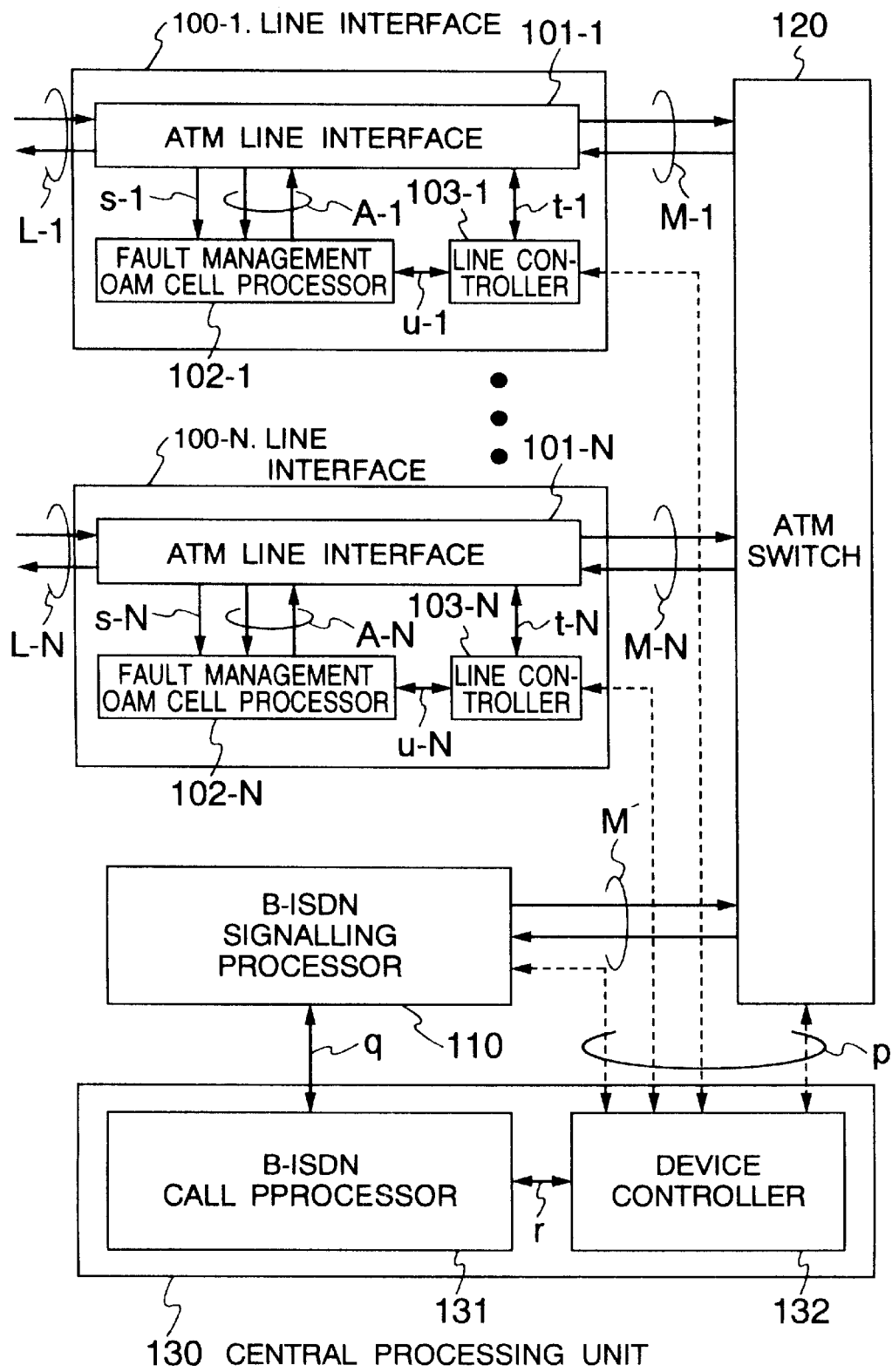
FIG. 1 is a diagram illustrating an embodiment of an ATM node device according to the present invention.

FIG. 1 shows an embodiment of a node device constituting a network (ATM network) according to the present invention.

A node device is constituted by an ATM switch 120 having N+1 input/output ports M (M-1 to M-N, and M'), N line interfaces 100 (100-1 to 100-N) provided for each ATM line L (L-1 to L-N) connected with a user terminal or another node device, and respectively connected with the input/output ports M-1 to M-N of the ATM switch, a B-ISDN signalling processor 110 connected with the input/output port M' of the ATM switch, and for performing signal processing between VC user terminals and node devices (thereinafter abbreviated to 'UNI') or between node devices (thereinafter abbreviated to 'NNI'), and a central controller (call control processor) 130 for call processing for giving and receiving messages with the B-ISDN signalling processor 110 and for giving and receiving control signals with the respective line interfaces 100-i (i=1 to N), the ATM switch 120 and the B-ISDN signalling processor 110.

Each line interface 100-i is constituted by an ATM line interface 101-i for input/output interface of ATM signals (ATM cell) and for adding and deleting internal control information such as routing information required in the ATM switch 120, a fault management OAM cell processor 102-i connected with the ATM line interface 101-i, and for performing extracting, inserting and processing operations of fault management OAM cells, and a line controller 103-i for performing control operation of the ATM line interface 101-i and the fault management OAM cell processor 102-i, and performing communication of control signals with the central controller 130.

The central controller 130 is constituted by a B-ISDN call processor 131 and a device controller 132 as mentioned above.

The fault management OAM cell processor 102-i has a VC table 200 shown in FIG. 2, upon every VP. This VC table 200 has a record constituted by a set-up indication field 201 indicating whether a VC connection is in set-up ("1") or not ("0") in accordance with VCI, and a fault management OAM cell support enabling indication field 202 indicating whether to transmit a fault management OAM cell is necessary ("1") or not ("0").

Figure 3:
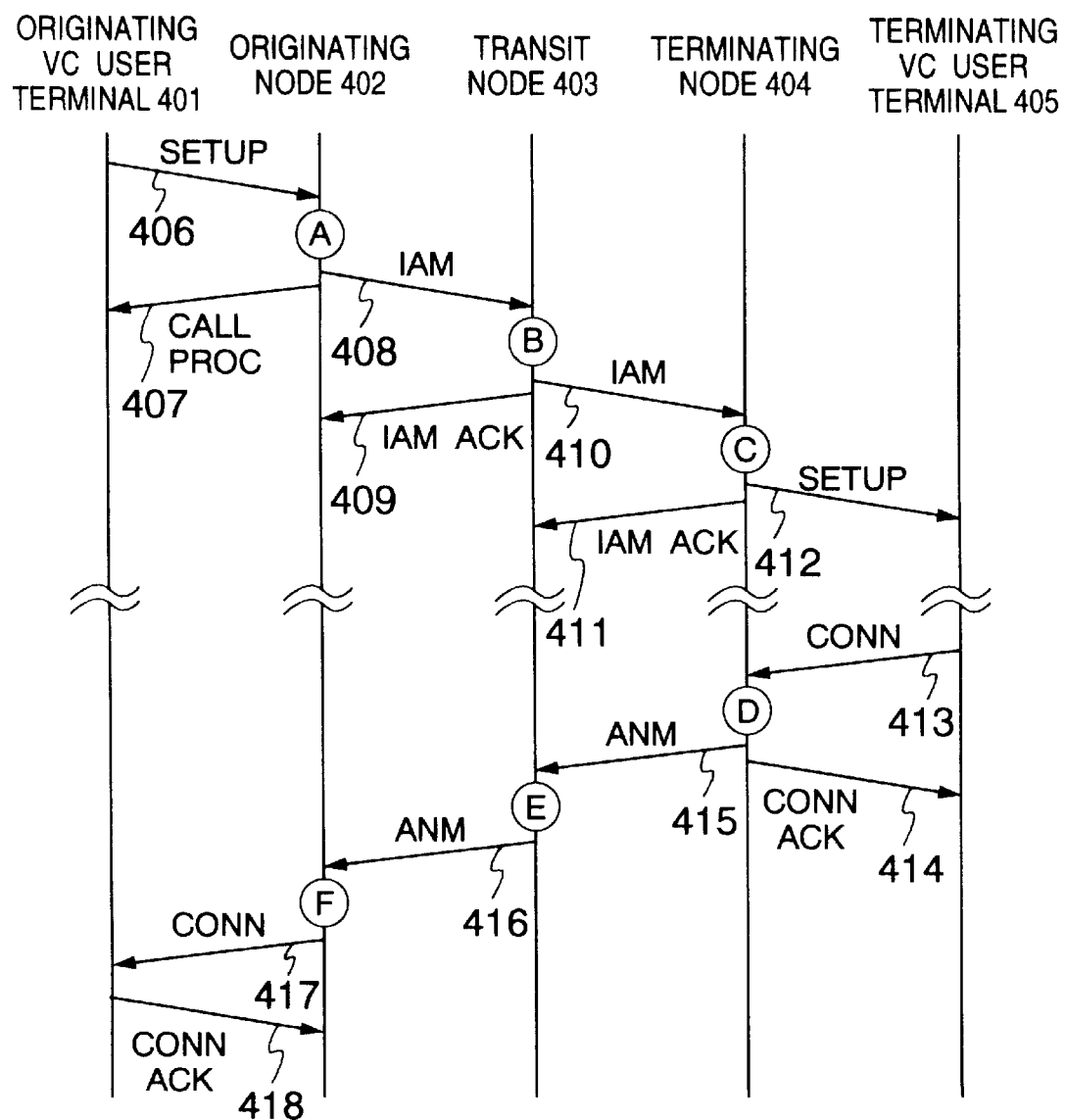
FIG. 3 is a diagram for explaining a transfer sequence of an OAM cell transfer control information according to the present invention.
Figure 4:
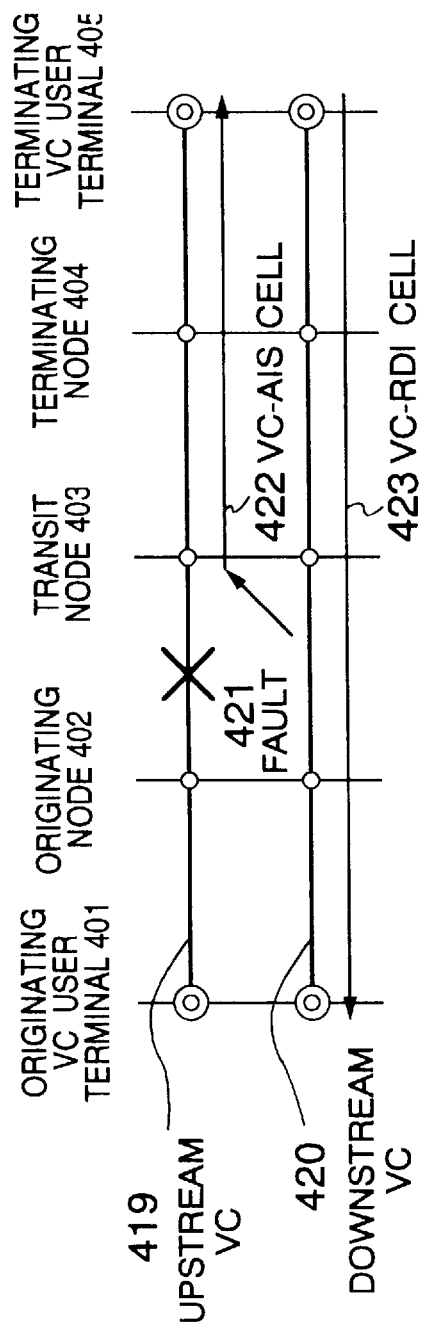
FIG. 4 is a diagram for explaining the production and transfer a fault management OAM cell (VC-AIS and VC-RDI)

FIG. 3 shows a portion of generation/transit sequence of a control message for call/connection set-up in a VC connection through three nodes of an originating node 402, a transit node 403 and a terminating node 404 corresponding to those in FIG. 4.

The message sequence shown therein is in accordance with ITU recommendation (Q.2900 series in UNI, and Q.2700 series in NNI).

The originating VC user 401 transmits a "SETUP" 406 as a set-up message to the originating node 402. After arrival of the "SETUP" 406, the originating node 402 transmits an IAM (Initial Address Message) 408 to the transit node 403, and returns a "CALL PROC (Call Proceeding)" 407 to the originating VC user 401. After arrival of the "IAM" 408, the transit node 403 transmits an "IAM" 410 to the terminating node 404, and returns an "IAM ACK" 409 to the originating node 402. After arrival of the "IAM" 410, the terminating node 404 transmits a "SETUP" 412 to the terminating VC user 405, and returns an "IAM ACK" 411 to the transit node 403.

The terminating VC user 405 transmits a "CONN (connect)" 413 to the terminating node 404 in order to set-up an after-set-up connection. After arrival of the "CONN" 413, the terminating node 404 transmits an "ANM (Answering Message)" 415 to the transit node 403, and returns a "CONN ACK" 414 to the terminating VC user 405. After arrival of the "ANM" 415, the transit node 403 transmits an "ANM" 416 to the originating node 402. After arrival of the "ANM" 416, the originating node 402 transmits a "CONN" 417 to the originating VC user 401. The originating VC user 401 receiving the "CONN" 417 returns a "CONN ACK" 418 to the originating node 402. Then, the set-up of a connection is completed.

According to the present invention, control information for indicating whether the user terminal should transmit a fault management OAM cell or not is set in advance in the "SETUP" 406 and 412, and the "IAM" 408 and 410.

Figure 5:
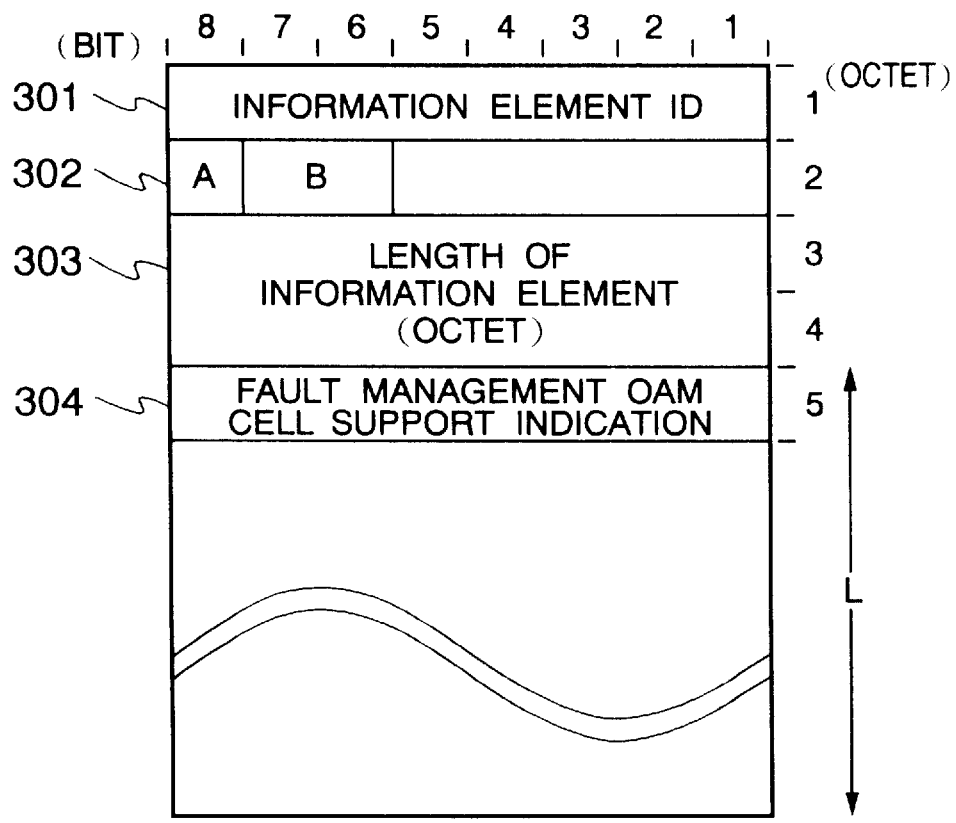
FIG. 5 is a diagram illustrating an example of a format of information elements carrying control information indicating the necessity or unnecessity to apply a fault management OAM cell.

The control information is transferred by loading each of the above messages with a fault management OAM cell support enabling information element 300 having a standard format of information elements prescribed in ITU-T Q.2931 "B-ISDN digital subscriber signalling system No.2", for example, as shown in FIG. 5.

The fault management OAM cell support enabling information element 300 has a first octet 301 including an information element ID, a second octet 302 including an extension bit, a CS (Coding Standard) field and an information element indication field, and a third and fourth octets 303 including information indicating the length of the contents of the following information elements. In this example, the length of the contents of the following information elements is one octet, and control information indicating the necessity or unnecessity to apply a fault management OAM cell (necessity or unnecessity of transmission) is set in a fifth octet 304.

Figure 6:
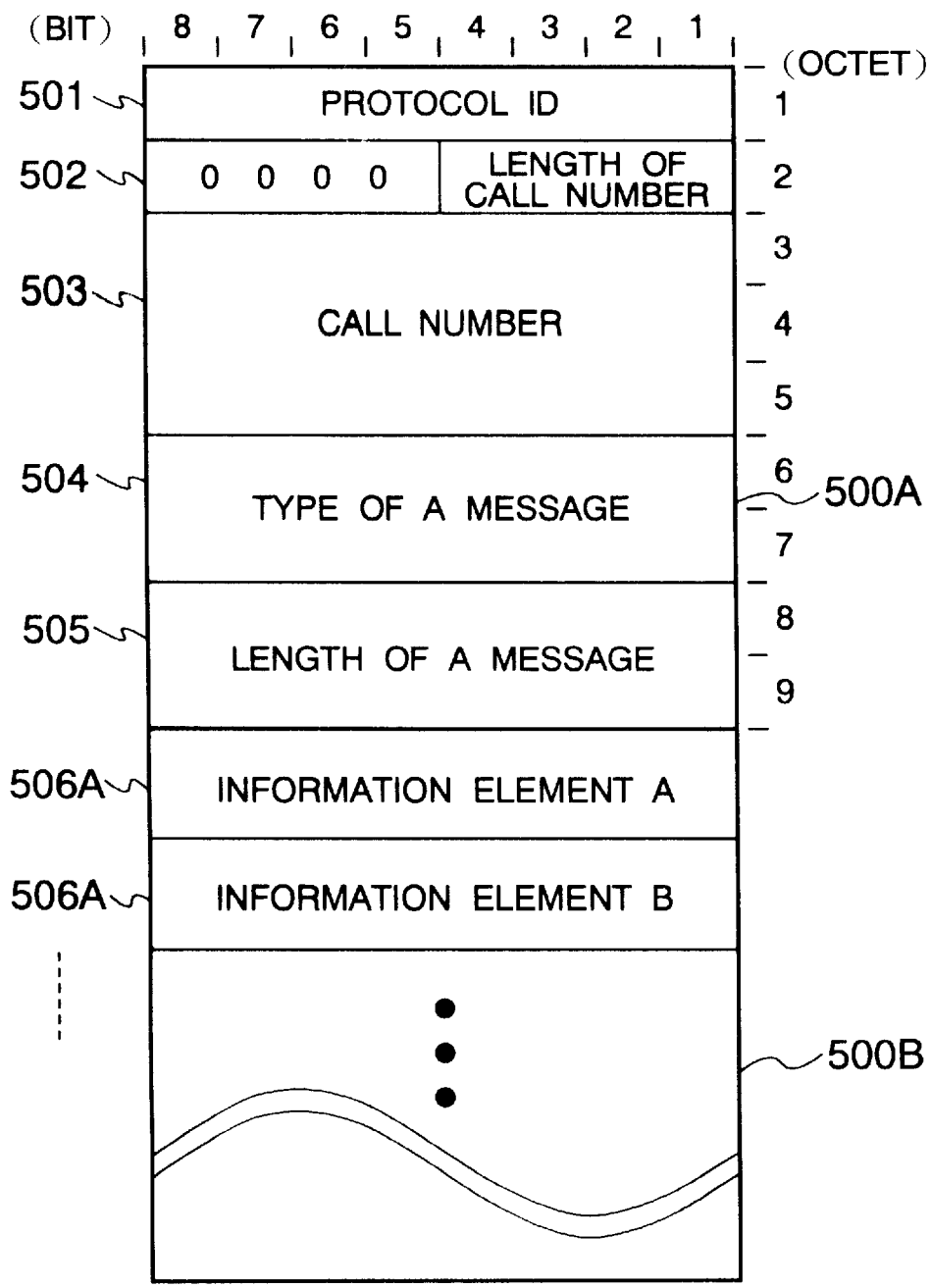
FIG. 6 is a diagram illustrating a format of a call control message.

FIG. 6 shows a format of a call control message such as set-up message.

A call control message 500 is constituted by a header 500A and a payload 500B. The header 500A includes protocol ID 501, length of call number 502 disposed next, call number 503, type of a message 504, and length of a message 505. The payload 500B has a structure in which a desired number of information elements 506A, 506B... are set as parameters.

The aforementioned fault management OAM cell support enabling information element 300 is set in the payload 500B as one of information elements.

Next, an embodiment of the present invention will be described with respect to the above-mentioned methods of (1) how to make notification of the necessity or unnecessity to transfer VC-AIS/RDI from a VC user terminal to a node device, (2) how to make notification of the necessity or unnecessity to transfer VC-AIS/RDI in every VC between node devices, and (3) how to make setting of control information as to the necessity or unnecessity to transfer VC-AIS/RDI in every VC in each of the node devices.

As described in FIG. 3, in the present invention, the "SETUP" 406 and 412, and the "IAM" 408 and 410 are loaded with the fault management OAM cell support enabling information element 300 shown in FIG. 5.

At the time of issuing a call, each user terminal can notify the necessity or unnecessity of fault management OAM cell support through the control information 304 of the information element 300 loaded on the "SETUP" 406 transmitted to the originating node. In addition, a sequence of generation/transfer of a call control message is defined between node devices, so that the necessity or unnecessity of fault management OAM cell transfer can be notified sequentially between the node devices if the information element 300 including the control information 304 extracted from the "SETUP" 406 by the terminating node is loaded on respective call control messages (the "IAM" 408 and 410, and the "SETUP" 412) transmitted sequentially on the VP from the originating node device toward the terminating node device. These call control messages are sent to the respective node devices on the VP in the form of a plurality of divided ATM cells having permanent length.

In each of the node devices, a control ATM cell having a call control message as its content is put from the line interface 100-i shown in FIG. 1 to the ATM switch 120, and outputted to the B-ISDN signalling processor 110. The B-ISDN call processor 131 performs adaptation of signalling, so that the B-ISDN call processor 131 obtains a call control message assembled from the control cells. In such a manner, the B-ISDN call processors 131 of the respective node devices 402, 403 and 404 can be notified of the control information 304 indicating the necessity or unnecessity of fault management OAM cell transfer.

Next, a manner to set-up the necessity or unnecessity of fault management OAM cell transfer into a VC table 200, which is performed in each of the node devices, will be described.

The control information indicating the necessity or unnecessity of fault management OAM cell support notified to the B-ISDN call processor 131 is notified to the line interface 103-i of the line interface 100-i receiving the control cell, through the device controller 132. Herein, an example where the notification of the control information is performed at the same time as the set-up operation of connection set-up information to the VC table 200 performed at the time of call set-up will be described.

The connection set-up information is set up into the VC table 200 at the points of time D, E and F shown in FIG. 3, in the terminating node 404, the transit node 403 and the originating node 402.

In this case, the B-ISDN call processor 131 of the central controller 130 gives instruction to the device controller 132 so as to transmit a set-up command to the line interface 103-i of the line interface 100-i where a target VC is stored.

In the line interface 103-i, the received command is interpreted, and connection set-up information to the VC table 200 is set up. Then, the necessity or unnecessity of fault management OAM cell support can be set in the field 202 of the VC table 200 mounted on the fault management OAM cell processor 102-i when the control information indicating the necessity or unnecessity of fault management OAM cell support is transferred together with the connection set-up information by the above-mentioned set-up command.

For example, if the number of VC connection which is a target of connection set-up is "51", the enabled bit "1"indicating that VC connection is in set-up is set in the set-up indication field 201 of the record of VCI (=51). If the user terminal of the VC has notified the unnecessity of fault management OAM cell support, the bit "0"indicating the unnecessity of fault management OAM cell support is set in the fault management OAM cell support enabling indication field 202 of the above-mentioned record.

With respect to VCs making communication in PVC mode, the bit "1"indicating the necessity of fault management OAM cell support is set in the support enabling indication field 202 at the time of assigning the VCs.

Each of the node devices can transmit a fault management OAM cell selectively in accordance with VCs with reference to the VC table 200.

For example, in the case where the transit node 403 shown in FIG. 4 detects a fault 421, the fault management OAM cell processor 102-i refers to the VC table 200 so as to determine whether a fault management OAM cell should be enabled for the VC 419 or not. If the unnecessity of fault management OAM cell support is set upon the VC 419, the operation of generation and transmission of the VC-AIS cell 422 is not performed. In this case, as a matter of course, also the VC-RDI cell 423 is not transmitted from the terminating VC user 405, so that it is possible to reduce the number of useless OAM cells flowing in the ATM network. In addition, it is not necessary for the VC users 401 and 405 to have a function of processing VC-AIS/RDI cells.

As is apparent from the above description, according to the present invention, the necessity or unnecessity to transmit a fault notification signal (OAM cell) is stored in accordance with VCs in each of node devices, so that when a fault arises, it is possible to selectively restrict useless fault notification signals from being transferred to SVC user terminals, and it is not necessary to compel the SVC user terminals to have a function to process a fault notification signal (OAM cell).

In addition, each of the user terminals notifies the necessity or unnecessity to transmit a fault notification signal, and transfers this to each node on a VP through call control parameters, so that it is possible to realize notification between users and node devices and between the node devices on the VP along a sequence regulated in call control.

It is to be understood that the above-described embodiments are merely illustrative of the principles of the invention and that many variations may be devised by those skilled in the art without departing from the spirit and scope of the invention. It is therefore intended that such variations be included within the scope of the claims.

What is claimed is:

1. An node device constituting an asynchronous transfer mode (ATM) network processing ATM cells, comprising:
    storage means for storing control information indicative of necessity or unnecessity of transmitting an alarm notification control cell in accordance with virtual connections (VC) multiplexed on virtual paths (VP); and
    transmitting means responsive to detection of a fault in one of said VPs, for determining necessity or unnecessity of transmitting an alarm notification control cell for each VC multiplexed on said fault VP on the basis of said control information stored in said storage means to selectively transmit said alarm notification control cell.

2. A node device according to claim 1, further comprising a plurality of input/output lines, and a plurality of interface means for interfacing provided for said input/output lines, respectively;
    each of said interface means having said storage means for storing control information, and said transmitting means.

3. A node device according to claim 1, further comprising a plurality of input/output lines; a plurality of interface means for interfacing, switch means for transferring a cell supplied from any one of said interface means to another interface means, and call control means connected to said switch means for controlling a call;
    each of said interface means having said storage means for storing control information and said transmitting means.

4. A node device according to claim 3;
    wherein said call control means is constituted by a signal processor connected to said switch means, and a controller for transferring messages to and from said signal processor;
    said signal processor is designed to supply a controlling cell given from said switch means to said controller after converting said control call into a message, and supply a message sent from said controller to said switch means after converting said message into a controlling cell;
    said controller is designed to notify said one of said interface means of said control information in accordance with the content of said call set-up message received from said signal processor.

5. A node device according to claim 1;
    wherein said alarm notification control cell is a fault management OAM cell according to ITU-T I.610.

6. A node device according to claim 2;
    wherein said alarm notification control cell is a fault management OAM cell according to ITU-T I.610.

7. A node device according to claim 3;
    wherein said alarm notification control cell is a fault management OAM cell according to ITU-T I.610.

8. A node device according to claim 4;
    wherein said alarm notification control cell is a fault management OAM cell according to ITU-T I.610.

9. A asynchronous transfer mode (ATM) network comprising a plurality of node devices, in which a first terminal stored in a desired first node device and a second terminal stored in a desired second node device communicate with each other by ATM cells through virtual channels (VC) multiplexed on a pair of virtual paths (VP) formed between said first node device and said second node device and having transfer directions different from each other;
    each of said node device including storage means for storing control information indicative of necessity or unnecessity of transmitting an alarm notification control cell in accordance with said VCs multiplexed on said respective VPs associated with its own node device, such that when a fault is detected in one of said VPs, the necessity or unnecessity to transmit an alarm notification control cell is determined for each VC multiplexed on said fault VP on the basis of said control information stored in said storage means, and said alarm notification control cell is transmitted to the downstream of said respective VCs in accordance with the result of the determination.

10. An ATM network according to claim 9;
    wherein each of said node devices includes a plurality of input/output lines, and a plurality of interface means provided for said input/output lines, respectively; and
    each of said interface means includes said storage means for storing control information and for selectively transmitting an alarm notification control cell to the respective VPs formed on said input/output lines.

11. An ATM network according to claim 9;
    wherein each of said node devices includes a plurality of input/output lines, a plurality of interface means for interfacing provided for said input/output lines, respectively, switch means for transferring a cell supplied from one of said interface means to another interface means, and call control means connected to said switch means; and
    each of said interface means includes said storage means for storing control information and selectively transmitting an alarm notification control cell to the respective VPs formed on said input/output lines.

12. An ATM network according to claim 11;
    said call control means being constituted by a signal processor connected to said switch means, and a controller for giving and receiving messages to and from said signal processor;

said signal processor being designed to supply a controlling cell received from said switch means to said controller after converting said control call into a message, and supply a message received from said controller to said switch means after converting said message into a controlling cell;

said controller being designed to notify said one of said interface means of said control information in accordance with the content of said call set-up message received by said signal processor.

13. An ATM network according to claim 9;

wherein said alarm notification control cell is a fault management OAM cell according to ITU-T I.610.

14. An ATM network according to claim 9;

wherein said first and second node devices have means for storing said control information indicating necessity or unnecessity of transmitting an alarm notification control cell in accordance with VCs lying between said first and second terminals, into said storage means on the basis of the notification from said first or second terminal during the executing process of call set-up procedures between said first and second terminals.

15. An alarm notification control method in a network which is constituted by a plurality of node devices and in which a first terminal stored in a desired first node device and a second terminal stored in a desired second node device communicate with each other through switched virtual connection (SVC), said alarm notification control method comprising the steps:

notifying by said first terminal, necessity or unnecessity of transmitting an alarm notification control signal through a control message issued for call set-up with said second terminal;

storing in said first and second node devices and a transit node device positioned on a virtual path (VP) between said first and second node devices, control information indicating necessity or unnecessity to transmit an alarm notification control signal in accordance with a VC assigned between said first and second node devices during the process of transmission/reception of said control message for call set-up; and in case of occurrence of a fault in the VP where said VC is formed, determining by one of said node devices which has detected said fault, necessity or unnecessity to transmit an alarm notification control signal for said VC on the basis of said control information which has been stored in said node device, to control the transmission operation of said alarm notification control signal for said VC in the downstream of said fault VP in accordance with the result of said determination.

16. An alarm notification control method according to claim 15, wherein said first terminal notifies necessity or unnecessity to transmit said alarm notification control signal by means of parameters in a call control message.

17. An alarm notification control method according to claim 15, wherein said parameters are set in said call control message as information elements according to ITU-T Q.2900 series or Q.2700 series.

18. An alarm notification control method according to claim 15, wherein said network is constituted by an asynchronous transfer mode (ATM) network dealing with ATM cells; and wherein said alarm notification control signal is a fault management OAM cell according to ITU-T I.610.

19. An alarm notification control method in a network which is constituted by a plurality of node devices and in which a first terminal stored in a desired first node device and a second terminal stored in a desired second node device communicate with each other through switched virtual connection (SVC) multiplexed on bidirectional virtual paths (VP), said alarm notification control method comprising:

notifying by said first terminal, the necessity or unnecessity to transmit an alarm notification control signal through a control message issued for call set-up with said second terminal;

by said first and second node devices and a transit node device positioned on VPs between said first and second node devices, storing control information expressing the necessity or unnecessity to transmit an alarm notification control signal in accordance with VCs assigned between said first and second node devices during the process of transmission/reception of said control message for call set-up;

in case of occurrence of a fault in any of said VPs where said VC is formed, determining by one of said node devices which has detected said fault, necessity or unnecessity to transmit an alarm notification control signal about said VC on the basis of said control information which has been stored in said node device to transmit a first alarm notification control signal about said VC toward the downstream of said fault VP in response to the determination indicating the necessity;

by one of said first and second terminals receiving said first alarm notification control signal, transmitting a second alarm notification control signal about said VC to the other VP; and by respective node devices, transferring said second alarm notification control signal onto the other VP sequentially to thereby make notification to the other of said first and second terminals.

20. A node device handling an asynchronous transfer mode (ATM), comprising:

a plurality of line interfaces transferring a cell between the node device and a terminal connected with the node device;

an ATM switch exchanging said cell between said plurality of line interfaces;

a signal processor connected with said ATM switch and processing a call control signal; and a call processor controlling said plurality of line interfaces, said ATM switch and said signal processor, wherein said node device stores contents of the call control signal received by said signal processor and operates in accordance with the stored contents, and wherein when said terminal instructs said node device based on the contents of said call control signal, control of transmitting of an alarm notification control cell in response to detection of a fault in a virtual path (VP) on which a virtual connection (VC) is multiplexed by said call control signal, is performed by said node device in accordance with the instruction.

21. A node device handling an asynchronous transfer mode (ATM), comprising:

a plurality of line interfaces transferring a cell between the node device and a terminal connected with the node device;

an ATM switch exchanging said cell between said plurality of line interfaces;

a signal processor connected with said ATM switch and processing a call control signal; and a call processor controlling said plurality of line interfaces, said ATM switch and said signal processor, wherein said node device stores contents of the call control signal received by said signal processor and operates in accordance with the stored contents, and wherein when said terminal provides said node device with an instruction of controlling transmitting of an alarm notification control cell based on the contents of said call control signal, said node device controls transmitting of said alarm notification control cell regarding said terminal in accordance with said instruction.

22. A node device handling an asynchronous transfer mode (ATM), comprising:

a plurality of line interfaces transferring a cell between the node device and a terminal connected with the node device;

an ATM switch exchanging said cell between said plurality of line interfaces;

a signal processor connected with said ATM switch and processing a call control signal; and a call processor controlling said plurality of line interfaces, said ATM switch and said signal processor, wherein said node device stores contents of the call control signal received by said signal processor and wherein when said terminal provides said node device with an instruction of not transmitting of an alarm notification control cell based on the contents of said call control signal, said node device operates in response to the contents of said stored instruction and causes said terminal to be free from having to perform a processing function for said alarm notification control cell.

* * * * *